United States Patent [19]
Myers

[11] 3,991,723
[45] Nov. 16, 1976

[54] FUEL INJECTION SYSTEM FOR ROTARY INTERNAL COMBUSTION ENGINE

[75] Inventor: David M. Myers, Upper Saddle River, N.J.

[73] Assignee: Curtiss-Wright Corporation, Wood-Ridge, N.J.

[22] Filed: Apr. 28, 1975

[21] Appl. No.: 572,127

[52] U.S. Cl.............. 123/8.09; 123/139 AP; 123/139 AQ; 123/139 AY
[51] Int. Cl.²................ F02B 53/10; F02M 39/00
[58] Field of Search........... 123/8.09, 8.11, 8.13, 123/139 AP, 139 AQ, 139 AY, 140 CC, 140 MC, 140 FG

[56] References Cited
UNITED STATES PATENTS

| | | | |
|---|---|---|---|
| 877,730 | 1/1908 | Palmer | 123/139 AP |
| 1,718,586 | 6/1929 | Schmidt | 123/139 AP |
| 1,996,710 | 4/1935 | Sass | 123/139 AY |
| 2,010,469 | 8/1935 | Triebnigg | 123/325 A |
| 2,179,354 | 11/1939 | Scott | 123/139 AP |
| 2,850,226 | 9/1958 | Lundquist | 415/49 X |
| 3,699,929 | 10/1972 | Bennethum | 123/8.09 |

FOREIGN PATENTS OR APPLICATIONS

| | | | |
|---|---|---|---|
| 820,580 | 11/1937 | France | 123/140 FG |

Primary Examiner—Charles J. Myhre
Assistant Examiner—Tony M. Argenbright
Attorney, Agent, or Firm—Arthur Frederick; Victor D. Behn

[57] ABSTRACT

The improved fuel injection system is for a rotary internal combustion engine having a housing within which a rotor is disposed for planetary rotary motion and which defines with the housing a plurality of combustion chambers. The improved fuel injection systems has a positive displacement fuel pump, such as of the plunger and barrel type, which is connected to deliver fuel to a fuel nozzle located to emit fuel into the combustion chambers upon actuation of the plunger. An actuating means, such as multi-profile cam is supported for rotation at a speed proportionate to rotor speed and disposed to effect reciprocative movement of the plunger. An automatic means, such as a pressurized fluid servomotor mechanism, is provided to effect a shifting of the cam relative to the pump plunger to change the speed of actuation of the plunger in proportion to rotor speed so that the duration of fuel injection into the combustion chambers at rotor speeds below high speed occurs during substantially the same amount of angular displacement of the rotor and for the same quantity fuel injected per revolution of the rotor as at high speed.

6 Claims, 3 Drawing Figures

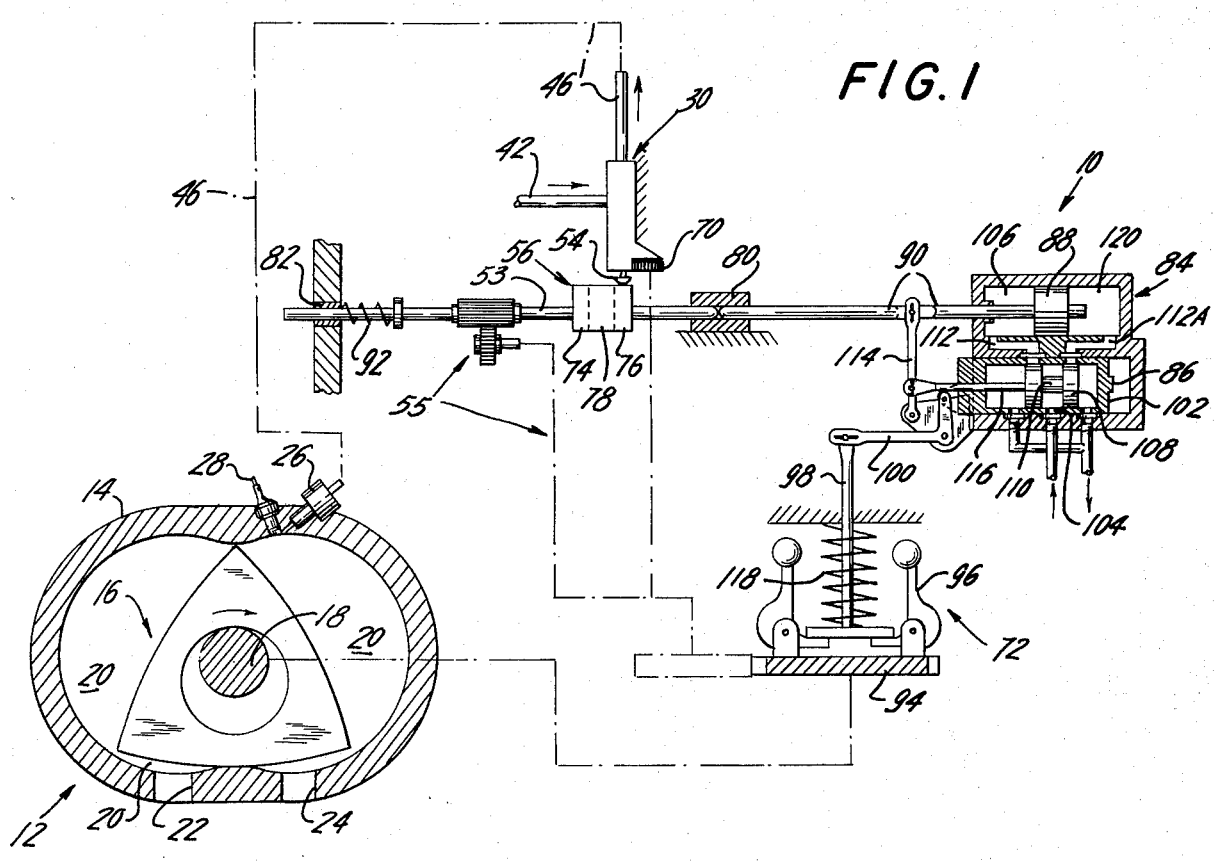

FUEL INJECTION SYSTEM FOR ROTARY INTERNAL COMBUSTION ENGINE

This invention relates to rotary internal combustion engines of the type disclosed in the U.S. Pat. No. 2,988,065 to Wankel et al, dated June 13, 1961 and, more particularly, to an improved fuel combustion system for rotary internal combustion engines of the aforesaid type.

BACKGROUND OF THE INVENTION

In rotary internal combustion engines having fuel combustion systems comprising an unthrottled air intake port and controlled injection of fuel, known as stratified charge fuel systems and as exemplified in the U.S. Pat. No. 3,246,636 to Bentele, dated Apr. 19, 1966; Jones, U.S. Pat. No. 3,393,667, dated July 23, 1968; and Jones, U.S. Pat. No. 3,698,364, dated Oct. 17, 1972, fuel injection is usually provided for by jerk pumps of the positive displacement plunger type. In this type of fuel injection pump such as is disclosed in the U.S. Pat. No. 2,565,681 to Fleck et al, dated Aug. 28, 1951, fuel is discharged to the combustion chambers of the engine by a cam actuated, reciprocable plunger, the rotational speed of the cam being proportional to the rotor speed of the engine for proper timing of the injections of fuel. The injection pump also includes a means for changing the effective stroke of the plunger in accordance with engine load or demand so that controlled amounts of fuel are injected into the combustion chambers at proper times.

In such engines having stratified charge fuel systems, above described, it has been found that, in spite of the fact that the angular speed of the pump cam is directly proportional to rotor rotation, the duration of fuel injection, relative to the angular rotor displacement (crank angle) for any given quantity of fuel, varies to a greater extent than is attributable to change in the speed of rotor rotation. More specifically, the efficient combustion of fuel is adversely affected when the engine speed changes from the speed at which the cam profile and fuel injection nozzles have been selected for optimum performance. This condition is attributable to the increased fuel injection duration relative to rotor velocity at high engine speeds due to expansion of the fuel feed conduits between the pump discharge and the fuel injection nozzles when, at high engine speeds, the pump plunger is actuated at high linear velocities. Expressed in another way, fuel injection duration is increased by reason of continued fuel injection after full discharge stroke of the pump plunger due to contraction of the fuel feed conduits following their expansion due to a substantial increase in fuel discharge pressure at high pump plunger linear velocities. It should be pointed out that these pressures are very substantial and can reach pressure values as high as 40,000 psi. This phenomenon results in the injection of fuel into the combustion chambers for different periods of time relative to crank angle or angular sweep of the rotor at high and low engine (rotor) speeds which causes changes in the air-fuel ratio in localized areas of the combustion chamber and hence the efficiency of fuel combustion and engine performance.

It is therefore an object of this invention to provide, in a rotary internal combustion engine, an improved fuel injection system having a positive displacement fuel pump, which system achieves improved fuel combustion over a wide range of engine speeds.

It is another object of the present invention to provide in a rotary internal combustion engine an improved fuel injection system having a positive displacement fuel pump wherein the duration of fuel injection at any given load is for the same amount of angular rotor displacement at both high and low rotor speeds.

SUMMARY OF THE INVENTION

Accordingly, the present invention contemplates an improved fuel injection system for a rotary internal combustion engine of the type having a rotor supported for planetary rotation in an engine housing cavity and in which the rotor and housing define a plurality of combustion chambers each of which successively expand and contract in volumetric size as the rotor rotates relative to the housing. The engine also includes an air intake port in the housing to pass air into the combustion chambers on the intake-expansion phase of operation and an exhaust port in the housing for discharging spent combustion products from the working chambers on the exhaust phase of operation. The engine without departure from the scope and spirit of this invention may be of the spark ignition, Otto cycle type or diesel type.

The improved fuel injection system according to this invention comprises a positive displacement fuel pump having an inlet port connected to receive fuel from a suitable source thereof and an outlet port connected, via conduits, to one or more nozzles to discharge fuel to the latter and its injection into the engine combustion chambers. The pump has a fuel displacement means which coacts with the inlet and outlet ports to force fuel through the nozzles into the combustion chambers. Actuating means for effecting actuation of the fuel displacement means and including changing means for changing the speed of actuation of the displacement means in direct relationship to the change in rotor speed so that the duration of fuel injection into the combustion chambers at rotor speeds below high speed occurs during substantially the same amount of angular displacement of the rotor and for the same quantity of fuel injected per revolution of the rotor as at high speed.

In a more limited aspect of the invention the displacement means is a piston or plunger mounted in a cylinder for reciprocative movement and the actuating means is a multi-profile cam coacting with the plunger to effect reciprocation thereof. The cam is so constructed that as rotor speed decreases the linear speed of translation of the plunger decreases to a greater extent than caused by the proportionate decrease in rotational speed of the cam. Thus, this effects an increase in the duration of fuel injection as rotor speed decreases to a greater extent than would be effected by the decrease in cam anglar velocity.

In a still more specific aspect of this invention the changing means may also include a control mechanism which automatically axially moves the multi-profile cam in proportion to rotor speed.

BRIEF DESCRIPTION OF THE DRAWINGS

The invention will be more fully understood from the following description when considered in connection with the accompanying drawings in which:

FIG. 1 is a schematic illustration of the fuel injection system according to this invention;

FIG. 2 is a cross-sectional view in detail of a fuel injection pump which may comprise part of the system shown in FIG. 1; and FIG. 3 is a perspective view of a multi-profile cam useful in the fuel injection system of this invention.

DESCRIPTION OF THE PREFERRED EMBODIMENT

Now referring to the drawings and more specifically, FIG. 1, reference number 10 generally designates the improved fuel injection system for a rotary internal combustion engine 12 which, as illustrated, may be of the Wankel et al type disclosed in the previously mentioned Wankel et al U.S. Pat. No. 2,988,065.

The engine 12 has a housing 14 which defines a cavity within which a rotor 16 is eccentrically supported for rotation on a driveshaft 18. The rotor 16 and housing 14 define a plurality of combustion chambers 20, each of which successively expand and contract in volumetric size as the rotor planetates relative to housing 14. An unthrottled air intake port 22 is provided in housing 14 to admit air into combustion chambers 20 upon expansion of the chambers during the intake phase of operation. Also, an exhaust port 24 is provided in housing 14 to pass spent products of combustion from combustion chambers 20 upon contraction of the chambers during the exhaust phase of operation. Fuel is injected into combustion chambers 20 at a preselected time relative to the angular position of rotor 16 through one or more fuel nozzles 26, such as shown in the U.S. Pat. No. 3,387,595 to Bentele; Jones, U.S. Pat. No. 3,393,667; Delano, U.S. Pat. No. 3,398,936 and Jones U.S. Pat. No. 3,698,364, the fuel nozzles 26 constituting part of fuel injection system 10. To ignite the air-fuel mixture, in combustion chambers 20 at a preselected time, an ignition system (not shown) employing an ignition device 28, such as a spark plug, is secured in housing 14 so as to communicate with the combustion chamber and/or the passage through which the fuel is emitted.

While the fuel injection system 10 is shown and described for a two-lobe Wankel engine, it has application engines of the one or more than two lobe types. Also it applies to Otto and diesel cycle engines and compression ignition type engines in general.

The improved fuel injection system 10 in addition to fuel nozzle 26 includes a positive displacement fuel pump 30 which may be of any suitable well known type, such as the plunger and barrel type, known as "jerk pumps", disclosed in the U.S. Pat. No. 2,565,681 to Fleck et al, dated Aug. 28, 1951, and wherein a cam effects reciprocation or translation of the plunger.

As best shown in FIG. 2 the positive displacement fuel pump 30 may be a typical cam actuated, jerk pump comprising a housing 32 containing a pump barrel or cylinder 34 and a valve housing 36 which are held in place by an internal nut 38. An inlet port 40 is provided in housing 32 and cylinder 34 and through suitable conduits 42 (FIG. 1) is in communication with a source of fuel (not shown). A discharge port 44 is formed in valve housing 36 to communicate with a discharge conduit 46 which is connected to fuel nozzle 26 (FIG. 1). A movable valve element 48 is biased by a spring 50 to a seated position against the end of cylinder 34. A plunger 52 is disposed for reciprocative movement in cylinder 34 and has cup end portion 54 which functions as a cam follower. The plunger is normally urged into a retracted position (downwardly as viewed in FIG. 1) and into engagement with a multi-profile cam 56 by a spring 58. The upper head end portion 60 of plunger 52 has the usual annular groove 62, scroll edge 64 and by-pass groove 66 by which upon rotation of plunger 52 about its longitudinal axis the effective stroke of the plunger is changed. Rotation of plunger 52 is effected by a gear 68 fixed to the plunger and a rack or gear 70, the gear 70 being suitably connected to a governor 72 (See FIG. 1) which is driven by engine driveshaft 18 so that plunger 52 is rotatively positioned in proportion to engine speed and hence in accordance with the fuel demand of the engine. As shown in FIG. 1, cam 56 is mounted on a shaft 53 and is rotated in proportion to the speed of rotor 16 through a suitable gear train 55.

As best shown in FIGS. 1 and 3, the multi-profile cam 56, in accordance with this invention, is provided with at least two profile surfaces 74 and 76. The profile surface 74 is of the type, commonly known as a "tangential cam", which provides for the translation of plunger 52 at the desired high linear velocity for a high engine speed or rotor angular velocity. The profile surface 76 is of the type commonly identified as a "convex cam" which provides for relatively slow linear velocity of plunger 52 at a low engine speed. By reason of the configuration of profile surface 76, the linear velocity of plunger 52 is lower than would be achieved by a single profile cam rotating proportionately slower by virtue of the lower rotor speed. Thus, the duration of fuel injection relative to angular displacement of rotor 16 is longer at a predetermined low rotor velocity than would occur with a single profile cam at that same predetermined rotor velocity. To permit plunger reciprocation at linear velocities intermediate the speeds of plunger translation at high and low speeds of rotor 16, the cam is provided with transition profile surfaces 78 interconnecting profile surfaces 74 and 76. To shift cam 56 relative to cam follower or cup end portion 54 of plunger 52, cam shaft 53 is supported in bearings 80 and 82 for both rotation about its longitudinal axis and linear, reciprocable, endwise movement.

A motor mechanism 84 is preferably provided to effect automatic shifting of cam 56 in accordance with change in angular speed of rotor 26. This motor mechanism 84 may be of any suitable type, as for example, as shown, a pressurized fluid servo-motor mechanism such as fully disclosed in the U.S. Pat. No. 2,570,847 to Ovens, dated Oct. 9, 1951 and comprising a servo-valve device 86 controlling the reciprocation of a piston 88, the piston 88 having a connecting rod 90 supported at one end in bearing 80 and engaging, at its one end, the end of cam shaft 53 supported in bearing 80. The ends of cam shaft 53 and piston rod 90 are maintained in contact by a spring 92 which biases cam shaft 53 to the right as viewed in FIG. 1. The motor mechanism 84 as illustrated in FIG. 1 provides infinite step linear movement of cam 52 in the manner herein briefly described.

In operation, when the angular velocity of rotor 16 increases from a relatively low rpm, barrel 94 of governor 72 is rotated at an increased angular velocity by reason of its connection to driveshaft 18. This increased angular velocity causes the flyweights 96 to move outwardly, thereby lifting push rod 98. The upward movement of push rod 98 pivots L shaped arm 100. Since arm 100 is connected at one end to cylinder 102 of servo-valve device 86, cylinder 102 is moved, as viewed in FIG. 1, to the right. This movement communicates pressurized fluid inlet port 104 with chamber 106 via the space between lands 108 of spool 110 and transfer port 112. The entry of pressurized fluid in chamber 106 urges piston 88 to the right as viewed in FIG. 1. The end of piston rod 90 is thus moved to the right in a direction away from contact with cam shaft 53. Since the cam shaft is biased by spring 92 in that direction, the cam shaft follows the axial movement of piston rod 90. This axial endwise movement of cam shaft 53 carries cam 56 to the right relative to pump 30 to bring follower 54 into contact with a different profile surface of the cam. The movement of piston rod 90 effects, via link 114 and piston rod 116 of spool 110, a proportionate movement of spool 110 to the right, so as to cut-off flow of pressurized fluid to chamber 106 through transfer port 112, in effect returning cylinder 102 and spool 110 to their neutral closed position. Further increase in speed will again cause movement of cylinder 102 to admit additional pressurized fluid into chamber 106 and effect a further movement of cam 56 via piston rod 90 and cam shaft 53. Again such movement of push-rod 90 will cause, through link 114 and piston rod 116, a movement of spool 110 to again cut-off pressurized fluid flow to chamber 106. This infinite step controlled movement which is proportionate to rotor speed continues until cam follower 54 of plunger 52 is engaging the cam profile 74. Reverse linear movement of cam 56 is effected in a similar manner. As rotor speed decreases and push rod 98 moves downwardly under the urging of a spring 118, cylinder 102 is moved to the left to admit pressurized fluid via transfer port 112A into chamber 120 to force piston 88, including its piston rod 90 and cam shaft 53 to the left as viewed in FIG. 1. As explained for the other direction of travel, spool 110 is moved relative to cylinder 102 to halt flow of pressurized fluid to chamber 120, by way of piston rods 90 and 116 and the interconnecting link 114. Thus as rotor speed continues to decrease, cam shaft 53 and cam 56 are moved until, as shown in FIG. 1, cam follower 54 rides on cam profile 76.

It is believed now readily apparent that the present invention now provides an improved fuel injection system for a rotary internal combustion engine in which the duration of fuel injection occurs at low rotor speed for substantially the same duration as the duration of fuel injection and for the same quantity of fuel per revolution of the rotor which occurs at high rotor speed. Thus, the same efficient combustion of fuel is attained throughout a broad range of engine speeds.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A spark-ignited rotary internal combustion engine of the Wankel type comprising a housing having a cavity and a rotor supported for planetary rotation within the cavity and defining with the housing a plurality of combustion chambers each of which successively expand and contract in volumetric size as the rotor and housing rotate relative to each other, the housing being provided with an inlet port and an exhaust port for respectively passing air into the combustion chambers and gaseous products of combustion from the combustion chambers, in combination with an improved fuel injection system comprising:
   a. at least one fuel injection nozzle in the housing located to discharge fuel into successive combustion chambers;
   b. a positive displacement fuel pump having an inlet port means for receiving fuel from a source thereof and an outlet port for discharging fuel therefrom;
   c. said pump having a fuel displacement means which coacts with the inlet and outlet ports to force fuel entering said inlet port out of the outlet port;
   d. conduit means connected to said outlet port of said pump and to said injection nozzle to conduct fuel discharged from the outlet port to said injection nozzle and discharge therefrom into the combustion chambers; and
   e. actuating means for effecting actuation of the fuel displacement means and including changing means for changing the speed of actuation of the displacement means in proportion to the change in rotor speed so that the duration of fuel injection into the combustion chambers at rotor speeds below high speed occurs during substantially the same amount of angular displacement of the rotor and for the same quantity of fuel per revolution of the rotor as at high speed.

2. The apparatus of claim 1 wherein said actuating means is a multi-profile cam.

3. The apparatus of claim 1 wherein said displacement means is a plunger mounted for reciprocative movement in a cylinder and the actuating means is a multi-profile cam rotating at velocities proportionate to rotor speeds and coacting with the piston to effect translation thereof.

4. The apparatus of claim 2 wherein said changing means includes a control mechanism automatically axially moves the multi-profile cam in accordance with change in rotor speed.

5. The apparatus of claim 4 wherein said control mechanism comprises servo-motor device operative in response to changes in rotor speed to move said multi-profile cam.

6. The apparatus of claim 4 wherein said actuating means is a reciprocable pump plunger and wherein said control mechanism is an infinite step, pressurized fluid servo-motor device operative in response to changes in rotor speed to move said multi-profile cam relative to said pump plunger.

* * * * *